United States Patent Office 3,661,859
Patented May 9, 1972

---

3,661,859
POLY(1,3-IMIDAZOLIDINE-2,4,5-TRIONES)
Tad L. Patton, Baytown, Tex., assignor to Esso
Research and Engineering Company
No Drawing. Continuation-in-part of application Ser. No.
808,004, Mar. 17, 1969. This application Apr. 17, 1970,
Ser. No. 29,657
Int. Cl. C08g *22/00, 22/08*
U.S. Cl. 260—77.5 CH         39 Claims

ABSTRACT OF THE DISCLOSURE

New heterocyclic polymers containing the 1,3-imidazolidine-2,4,5-trione-1,3-diyl structure are produced by hydrolyzing the polymers formed by the reaction of diisocyanates with hydrogen cyanide, by the reaction of dicyanoformamides with diisocyanates and by the polymerization of cyanoformamidyl isocyanates. The new heterocyclic polymers are stable and are useful in the formation of films, fibers, foams, and molded objects.

CROSS REFERENCE TO RELATED APPLICATIONS

This is a continuation-in-part application of Ser. No. 685,311 filed Nov. 24, 1967, entitled "Heterocyclic Polymers" and Ser. No. 808,004 filed Mar. 17, 1969, entitled "Hydrolyzed Heterocyclic Polymers," now abandoned.

BACKGROUND OF THE INVENTION

(1) Field of the invention

The present invention is directed to new heterocyclic polymers characterized by the tri-substituted 1,3-imidazolidine-1,3-diyl ring as follows:

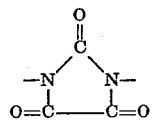

(2) Prior Art

The reaction of monoisocyanates with hydrogen cyanide is known as disclosed by W. Dieckmann et al., Berichte 38, 29–77 (1905).

An article in Die Macromolekulare Chemie 78, 186 (1964) by Oku et al. discloses:

"Starting from diisocyanates and hydrogen cyanide poly(5-imino-hydantoins) have been prepared by the following two methods: (1) polyaddition between a diisocyanate and a di(carbamoyl cyanide), which corresponds to a 1:2 diisocyanate-hydrogen cyanide adduct; (2) hydrogen cyanide eliminating polymerization (polycondensation) of a di(carbamoyl cyanide). The former method generally gave more satisfactory results."

SUMMARY OF THE INVENTION

The new heterocyclic polymers of the present invention may be prepared by the hydrolysis of the polymers formed by the reaction of hydrogen cyanide with a diisocyanate or mixture of diisocyanates, the reaction of a dicyanoformamide or mixture of dicyanoformamides with a diisocyanate or a mixture of diisocyanates, or the polymerization of a cyanoformamidyl isocyanate. The heterocyclic polymers of the present invention, independent of the particular method for preparing the precursor polymer, all contain the imidazolidinetrione ring below:

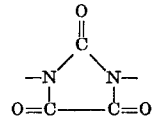

The precursor polymers produced by any of the foregoing methods are characterized by a 1,3-imidazolidine-1,3-diyl ring of the following structure:

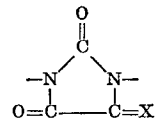

where:

X is selected from the group NH and
N— and is in the 4 or 5 position.

There precursor polymers may be hydrolyzed without first being isolated from solution or if isolated may be redissolved in a suitable solvent and then hydrolyzed to form the poly (1,3-imidazolidinetrione) polymers of the present invention. The precursor polymers may precipitate from solution during their formation or they may remain in solution and then be isolated by precipitation. The solid precursor polymers may be hydrolyzed with an aqueous Bronsted acid or an anhydrous acid followed by contact with water.

DESCRIPTION OF THE PREFERRED EMBODIMENTS

The new heterocyclic polymers of the present invention may be derived by the hydrolysis of the precursor polymers formed by the reaction of hydrogen cyanide with a diisocyanate or mixture of diisocyanates produced by three distinct methods: (I) reaction of hydrogen cyanide with diisocyanates; (II) reaction of dicyanoformamides with diisocyanates; and (III) polymerization of cyanoformamidyl isocyanates. A specific poly (1,3-imidazolidinetrione) polymer produced by a specific method and/or from a specific diisocyanate or mixture of diisocyanates may differ over a wide range of chemical and physical properties from another polymer produced by one of the other methods and/or from another diisocyanate or mixture of diisocyanates. These differences in chemical properties stem in part from the specific polymerization reaction used to produce the precursor polymer which is hydrolyzed as well as in part from the vast number of diisocyanates, dicyanoformamides and cyanoformamidyl isocyanates which may be used as starting materials. To illustrate the present invention and all of its ramifications, illustrative methods of producing precursor polymers which are hydrolyzed according to the present invention will be considered individually.

(I) REACTION OF HYDROGEN CYANDIE WITH DIISOCYANATES

The diisocyanates which may be used in the reaction with hydrogen cyanide to produce precursor polymers which may be hydrolyzed according to the present invention are characterized by the formula:

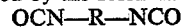
OCN—R—NCO where:

R is the organic moiety of the diisocyanate which may be aliphatic, alicyclic, aromatic or mixtures thereof and functionally substituted derivatives thereof provided the functional group does not react with an isocyanate group.

Thus, the diisocyanates may be selected from a broad group having a large variety of organic moieties. The organic moieties of the diisocyanates may be substituted with groups such as alkyl, aryl, halogens, sulfoxy, sulfonyl, alkoxy, aryloxy, oxo, ester, alkylthio, arylthio, nitro and the like which do not react with the isocyanate group. Functional groups which have active hydrogen atoms (e.g., carboxylic acids, phenols, amines, etc.) should not be present.

Each diisocyanate may be characterized by its specific organic moiety. For example, those diisocyanates having an aliphatic hydrocarbon moiety are exemplified by tetramethylene diisocyanate; hexamethylene diisocyanate; dodecamethylene diisocyanate; 2,2,4-trimethylhexamethylene diisocyanate; and the like. Diisocyanates characterized by having aromatic hydrocarbon moieties are exemplified by m-phenylene diisocyanate; p-phenylene diisocyanate; biphenylene diisocyanate; 1,5-naphthalene diiisocyanate; and the like. A diisocyanate having an alicyclic hydrocarbon moiety is 1,4-diisocyanato cyclohexane and 3-isocyanato-methyl-3,5,5-trimethylcyclohexyl isocyanate. The diisocyanates containing more than one type of hydrocarbon moiety are exemplified by toluene diisocyanate; durene diisocyanate; 4,4'-diphenylmethane diisocyanate; 3,3'-dimethyl-4,4'-diphenylene diisocyanate; 4,4'-diphenylisopropylidene diisocyanate; p-xylylene diisocyanate; m-xylylene diisocyanate; 4,4'-methylene bis(cyclohexyl isocyanate); 4-(4-isocyanatocyclohexyl) phenylisocyanate; 4-isocyanatobenzyl isocyanate; and the like. It is noted that in the foregoing examples the isocyanate groups in each of the diisocyanates may be attached to the same or different hydrocarbon portions of the organic moiety. Further, diisocyanates which have organic moieties containing functional groups may also be used and are exemplified by 4,4'-diphenylsulfone diisocyanate; 4,4'-diphenyl-ether diisocyanate; 3,3'-dimethoxy-4,4'-diphenylene diisocyanate; di(3-isocyanato-propyl)ether; tetrafluoro-p-phenylene diisocyanate; tetrafluoro-m-phenylene diisocyanate; 4,4'-diisocyanate-octafluorobiphenyl and the like. Mixtures of the diisocyanates may be used. Diisocyanate, as used herein, is a general class of compounds meant to include those compounds which have polymeric organic moieties such as the prepolymer diisocyanates which are used in the field of urethane polymers. Further, specific diisocyanates which may be used in the present invention are found in patents, articles, or organic textbooks; a specific example being the paper "Mono and Polyisocyanates" by W. Sieflken, Annalen der Chemie 562, 6–136 (1949), which is incorporated herein by reference.

The reaction of diisocyanates with hydrogen cyanide is referred to herein as the "one-shot" method. The "one-shot" method may be carried out by any of the general procedures set forth hereinafter.

(II) REACTION OF DICYANOFORMAMIDES WITH DIISOCYANATES

Another method for producing precursor heterocyclic polymers which may be hydrolyzed to contain the imidazolidinetrione ring referred to hereinabove is carried out by the reaction of dicyanoformamides with diisocyanates. Preferably, the reaction is initiated and propagated by the presence of an added cyanide ion. The diisocyanates used in this reaction may be selected from the diisocyanates set forth and illustrated above. The dicyanoformamides are prepared by reaction of hydrogen cyanide with these same diisocyanates and have the following general structure:

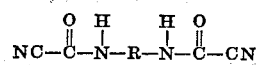

where:

R is the organic moiety of the diisocyanate from which the dicyanoformamide was prepared.

The reaction of a dicyanoformamide or a mixture of dicyanoformamides with a diisocyanate or a mixture of diisocyanates to produce the precursor heterocyclic polymers which may then be hydrolyzed according to the present invention can be carried out by adding a solution of cyanide ion catalyst to the reaction solution of the dicyanoformamide and diisocyanate or by adding the diisocyanate solution and a solution of the dicyanoformamide to the cyanide ion catalyst in a solvent. Preferably, the latter technique is used with the addition of the solution of diisocyanates and the solution of dicyanoformamides being controlled such that the solutions are added simultaneously and in equal molar amounts. Since the reaction is exothermic, the reaction temperature is more easily controlled when the preferred technique is used.

The precursor heterocyclic polymers produced by the reaction of a dicyanoformamide with a diisocyanate contain repeating units which include two imidazolidine rings and the organic moiety ($R_1$) from the diisocyanate and the organic moiety ($R_2$) from the dicyanoformamide. The polymer thus may be characterized by the following general repeating unit:

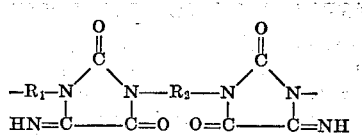

where:

$R_1$ is the organic moiety from the diisocyanate, and
$R_2$ is the organic moiety from the dicyanoformamide.

The precursor polymers produced by this step-growth polymerization method are generally characterized by the methodical alternation of the oxo and imino groups between positions 4 and 5 on the sequential imidazolidine rings in the polymer chains. The mode of formation of the imidazolidine rings is considered to be responsible for this alternating regularity. The two imidazolidine rings are formed with the oxo and imino groups ultimately being located at positions 4 and 5, respectively, on one imidazolidine ring and at positions 5 and 4, respectively, on the succeeding imidazolidine ring. On every imidazolidine ring, each imino group will be attached to the carbon atom adjacent to the nitrogen atom which was derived from the diisocyanate.

When the organic moiety of the diisocyanate differs from the organic moiety of the dicyanoformamide, polymers having isomeric structures may be produced by exchanging the organic moieties of the two reagents or monomers. This may be best illustrated by the following specific example where equimolar quantities of the dicyanoformamide and diisocyanates are employed.

In the case of the reaction of hexamethylene dicyanoformamide (illustrating a dicyanoformamide having an aliphatic organic moiety) with 4,4'-diphenylmethane diisocyanate (illustrating a diisocyanate having a mixed hydrocarbon moiety), a polymer having the following repeating units is produced:

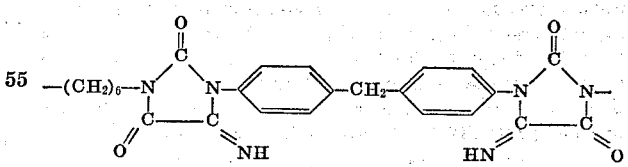

The structural isomer of the foregoing polymer may be prepared by reversing the organic moieties in the monomers; thus, the reaction of equimolar parts of hexamethylene diisocyanate and 4,4'-diphenylmethane dicyanoformamide forms a polymer having the following repeating units:

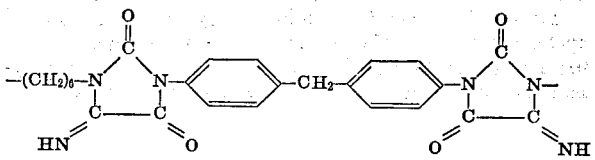

It has been found that the most reactive diisocyanates and dicyanoformamides are those in which the organic moiety is aromatic.

(III) POLYMERIZATION OF CYANOFORMAMIDYL ISOCYANATES

A third method for producing the precursor heterocyclic polymers which may be hydrolyzed to contain the imidazolidinetrione ring referred to hereinabove is the head-to-tail polymerization of cyanoformamidyl isocyanates. Preferably, this polymerization is initiated and propagated in the presence of an added cyanide ion. The cyanoformamidyl isocyanates have the following general structure:

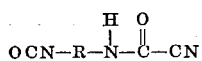

where:

R is the organic moiety of the diisocyanate from which the cyanoformamidyl isocyanate was prepared.

The reaction of two moles of hydrogen cyanide with one mole of diisocyanate produces the dicyanoformamides. On the other hand, the formation of cyanoformamidyl isocyanates (the mono adduct of the diisocyanate) involves the reaction of only one mole of hydrogen cyanide with one mole of diisocyanate.

The precursor heterocyclic polymers produced by the polymerization of a cyanoformamidyl isocyanate or mixtures of cyanoformamidyl isocyanates are made up of repeating units which may be characterized by the following general repeating unit:

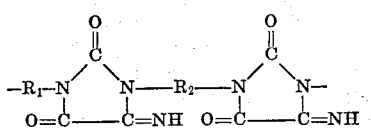

where:

$R_1$ and $R_2$ are the organic moiety from the cyanoformamidyl isocyanate.

The polymers produced by the polymerization of a single cyanoformamidyl isocyanate will have repeating units where $R_1$ and $R_2$ are the same; however, $R_1$ and $R_2$ may be different if a mixture of cyanoformamidyl isocyanates are used. The polymers produced by the polymerization of cyanoformamidyl isocyanates are thus generally characterized by the imino and oxo groups on the imidazolidine rings being located in the same position (4 and 5 respectively) on each sequential imidazolidine ring. The particular structure of the polymers produced using a mixture of cyanoformamidyl isocyanates is dependent upon the reactivity of the respective cyanoformamidyl isocyanates so that block or random copolymers may be produced.

POLYMERIZATION REACTION CONDITIONS

These polymerization reactions referred to hereinbefore are carried out under ambient temperatures and pressure and anhydrous conditions; however, the reactions are exothermic so that cooling may be required. While the reactions may be started at temperatures from 0° to 60° C., preferably 10° to 40° C., the temperature is controlled so as not to exceed 140° C., and preferably 90° C. At higher temperatures, pressure equipment may become necessary due to the volatility of hydrogen cyanide (B.P. 25° C.). These reactions may be carried out under a blanket of inert gas such as nitrogen.

The polymerization reactions to form the precursor polymers may be carried out in a wide variety of solvents. Dipolar aprotic solvents are preferred when it is desired to keep the precursor polymers in solution. Suitable dipolar aprotic solvents for this purpose are dimethylformamide, dimethylacetamide, dimethylsulfoxide, hexamethylphosphoramide and N-methylpyrrolidone. Other polar aprotic solvents in which the precursor polymers have limited solubilities and which may be used as media for the formation of precursor polymers are methylbenzoate, dimethylphthalate, nitrobenzene, acetonitrile, and the like. All of these solvents may be used in admixture with each other or in admixture with other aprotic solvents such as benzene, toluene, xylene, methylacetate, ethylacetate, anisole, phenetole, butyl benzoate, chlorobenzene, etc. in which the precursor heterocyclic polymers are insoluble. Anhydrous solvents are used since water will react with isocyanates.

The precursor heterocyclic polymers which may be hydrolyzed to produce the polymers of the present invention may be prepared by the reaction of hydrogen cyanide with a diisocyanate or mixture of diisocyanates, the reaction of a dicyanoformamide or mixture of dicyanoformamides with a diisocyanate or a mixture of diisocyanates or the polymerization of a cyanoformamidyl isocyanate or mixture of cyanoformamidyl isocyanates by catalysis of an added cyanide ion or of a base or organometallic compound.

(A) CATALYSIS BY ADDED CYANIDE ION

In the production of the precursor heterocyclic polymers which are hydrolyzed according to the present invention, it is preferred that the polymerization be carried out in the presence of a cyanide ion. The formation of each heterocyclic ring in the polymer chain may occur by a series of three concerted reactions when catalyzed by the cyanide ion. These reactions are illustrated as follows:

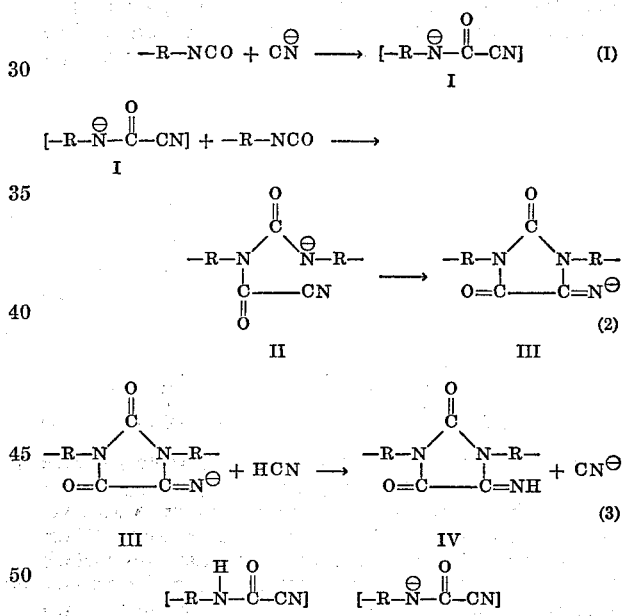

It has been observed generally that ring closure to form the imidazolidine ring is slower when the organic moiety of the diisocyanate is aliphatic. As illustrated in the reaction (2) above, the intermediate cyanoformylurea anion may be more easily cyclized when the organic moiety is an electron withdrawing group such as an aromatic ring. There is evidence that in some instances there is not complete ring closure of all the cyano formylurea linkages to form the imidazolidine rings and it may be that a cyanoformylurea intermediate (shown below as V) is formed from the anion (II) by the abstraction of hydrogen from hydrogen cyanide or from the cyanoformamide. The ring closure reaction is known to be easily catalyzed with a tertiary amine. This reaction is illustrated by the following:

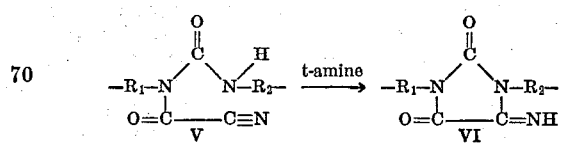

Accordingly, after the polymerization reaction has subsided, usually 5–120 minutes after the addition of all reagents is complete, a tertiary amine may be added to the reaction solution. The purpose of the amine is to insure the cyclization of all cyanoformylurea linkages in the polymer chain to 4-imino-1,3-imidazolidine-2,5-dione rings. Exemplary tertiary amines are triethylamine, trimethylamine, N-methyl morpholine, N-methyl piperidine, triethylenediamine, etc.

Bases such as N,N-dialkylanilines, pyridine, picoline, and lutidine may be used but are less effective than the aliphatic tertiary amines. The quantity of t-amine added to the reaction solution may be at least 0.0005 molar equivalents of the isocyanate groups used in the reaction. Preferably, 0.001–0.5 molar equivalents of the isocyanate groups is used.

After adding the t-amine, the reaction solution is stirred from five minutes to ten hours, but preferably ten to sixty minutes. The temperature of the reaction solution when the t-amine is added is preferably 20–90° C., and the most preferable temperature range is 20–50° C.

(B) CATALYSIS BY BASE OF ORGANO-METALLIC-COMPOUND

The precursor heterocyclic polymers which are hydrolyzed according to the present invention and which are prepared by any of the methods set forth above may use a base or an organometallic compound as a catalyst. However, these catalysts may lead to cross-linking and gel formation unless the reaction conditions are controlled. The concerted reactions which may occur using such a catalyst are illustrated as follows:

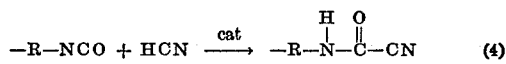

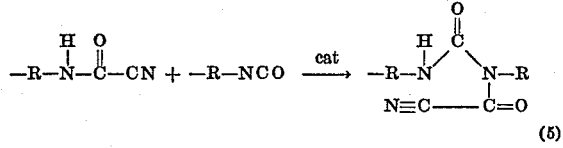

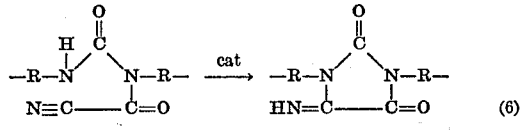

Bases which have sufficient activity to promote all three reactions (4, 5 and 6 above) are tertiary nitrogen compounds which have no active hydrogen atoms. A wide variety of compounds will catalyze these reactions. These compounds include the tertiary nitrogen compounds which have no active hydrogen atoms including the tertiary amines such as triethylamine, triethylenediamine, 1-aza-3,3,7,7 - tetramethyl bicyclo (3.3.0) octane, 1 - methyl piperidine, N,N - dimethylaniline, N-methyl dicyclohexylamine, N,N - dimethylcyclohexylamine, N - cyclohexylpiperidine, and N - cyclohexyl morpholine; heterocyclic bases such as pyridine, 2 - picoline, 4 - picoline, 3-picoline, 2,6 - lutidine, 2,4 - lutidine, and quinoline; phosphorus compounds such as triphenyl phosphine and tributyl phosphine; tin compounds such as dibutyl tin dilaurate, dibutyl tin diacetate, bis (tributyl tin) oxide, dibutyl tin bis(2-ethylhexoate), dibutyl tin bis(isooctylmaleate), and tetrabutyl tin; and lead compounds such as trimethyl plumbyl acetate and 1-(tri-n-butyl plumbyl) imidazole.

The polymers produced by the catalysis of an added cyanide ion or of a base or organo-metallic compound may be isolated by precipitation. Before precipitation of the polymer, or after precipitation from the reaction solvent, it may be treated with an isocyanate-reactive compound such as an alcohol, secondary amine, or primary amine which will react with the isocyanate end groups. This effectively eliminates the isocyanate groups so that cross-linking by their reaction with the imino groups of the heterocyclic rings does not occur.

Precipitation of the precursor polymer if soluble in the reaction solvent may be carried out by pouring the reaction solution into an isocyanate-reactive solvent such as methanol, ethanol, propanol, dilute ammonium hydroxide, primary and secondary amines, or water, or into a solvent such as benzene, toluene or acetone which will not react with the isocyanate end-groups. The isocyanate-reactive solvent will react with the terminal isocyanate groups to form carbamates, ureas, or amines which will prevent further reaction and undesirable side reactions. A more stable precursor polymer is produced when it is precipitated in an isocyanate-reactive solvent.

HYDROLYZED POLYMERS

The heterocyclic polymers of the present invention are characterized by the presence of the 1,3-imidazolidine-2,4,5-trione-1,3-diyl ring. The polymers of the present invention are produced by hydrolyzing the precursor polymers formed by the reaction of hydrogen cyanide with diisocyanates, by the reaction of dicyanoformamides with diisocyanates or by the polymerization of cyanoformamidyl isocyanates as fully set forth hereinbefore.

The hydrolysis reaction may be carried out by contacting the precursor heterocyclic polymer characterized by the imino-1,3-imidazolidinedione rings with aqueous solutions of Brönsted acids such as hydrochloric, hydrobromic, sulfuric, formic, and the like, or with anhydrous hydrogen chloride or hydrogen bromide such that when the polymer is contacted with water or precipitated in water, hydrolysis of the imino groups will occur to produce the desired polymer characterized by 1,3 - imidazolidine-2,4,5-trione-1,3-diyl rings. The precursor polymers produced by any of the foregoing methods may be precipitated from the reaction solution during formation because of choice of reaction solvent or may be precipitated in an isocyanate-reactive or nonreactive solvent after completion of the polymerization. The solid precursor polymer may then be hydrolyzed either as a solid suspension or by redissolving it in a suitable solvent. The solid precursor polymer is preferably suspended in an aqueous solution of a Brönsted acid to carry out the desired hydrolysis. However, the solid precursor polymer may be contacted with anhydrous hydrogen chloride, for example, and thereafter be contacted with water to complete the desired hydrolysis. The hydrolysis may also be carried out when the precursor polymer is in solution. The solution of the precursor polymer may be the original polymerization solution in which the precursor polymer was made so the hydrolysis may be carried out in situ immediately after formation of the precursor polymer formed by any of the foregoing methods. A solution may also be formed by redissolving the isolated precursor polymer in a preferable solvent.

When an aqueous solution of acid is added to a solution of the heterocyclic polymer characterized by the imino-1,3-imidazolidinedione ring, the extent of hydrolysis may be controlled by the quantity of acid used. Complete hydrolysis requires a molar quantity of acid equivalent to the molar quantity of imino groups to be hydrolyzed. The heterocyclic polymers before and after hydrolysis are insoluble in water, however, the more dilute the acid solution used the more likely is precipitation of polymer to occur during the hydrolysis. This precipitation may cause the time for the hydrolysis reaction to be extended until the polymer can redissolve.

To overcome the heat of solution generated by adding the aqueous acid to the reaction solution or a solution of the imino-1,3-imidazolidinedione polymer redissolved in a solvent, the aqueous acid may be first mixed in the same solvent in which the polymer is dissolved and the mixture then added to the polymer solution. This premixing of the acid and solvent allows the hydrolysis reaction to be carried out in a shorter period of time.

To eliminate the precipitation caused by the addition of aqueous acids, another procedure for carrying out the hydrolysis reaction is to bubble anhydrous hydrogen chloride or anhydrous hydrogen bromide through the polymer solution to first form the acid salt of the polymer which is then precipitated in water to complete the hydrolysis. The acid salt of the polymer characterized by the imino-1,3-imidazolidinedione rings is soluble in the dipolar aprotic solvents. Considerable heat is generated when anhydrous hydrogen chloride or hydrogen bromide is added to a dipolar aprotic solvent. Therefore, to eliminate the necessity of cooling the polymer solution during hydrolysis, a solution of the anhydrous hydrogen chloride or hydrogen bromide may be premixed in the solvent in the same manner as the premixing of the aqueous acid, cooled, and then added to the stirred solution of the polymer. Thereafter the hydrolysis of the polymer is completed during its precipitation in water.

Hydrolysis occurs rapidly and may be complete within a few minutes at room temperature. Complete hydrolysis requires a molar quantity of acid equivalent to the molar quantity of imino groups to be hydrolyzed. The general temperature conditions for hydrolysis are between 10° and 120° C., preferably between 20° to 40° C. The hydrolysis conditions may be maintained for a few minutes to several hours.

Cross-linked heterocyclic polymers may be produced by the reaction of hydrogen cyanide with diisocyanates or by the reaction of dicyanoformamides with diisocyanates, especially when high temperatures (>80° C.) and basic catalysts are used in the initiation and propagation of the polymerization reaction. If cross-linking does occur during the formation of the precursor heterocyclic polymers with a resulting gel being formed, a soluble polymer of the present invention may be produced by the acid hydrolysis of these cross-linked polymers with an excess of acid.

The polymers of the present invention are characterized as poly (1,3 - imidazolidinetrione) polymers and are formed by the hydrolysis of polymers formed by any of the foregoing methods which are characterized as the heterocyclic polymers before hydrolysis or by their imino-1,3-imidazolidinedione rings. The preparation of the polymers of the present invention are illustrated by the following examples which are set forth for illustration. In all examples, the intrinsic viscosities are determined in dimethylformamide at 25° C. and the inherent viscosities are determined at a concentration of 0.5 gram of polymer per 100 ml. of dimethylformamide at 25° C. unless otherwise specified.

EXAMPLE 1

A solution of 6.48 gms. of hydrogen cyanide in 145 ml. of nitrobenzene was mixed with a solution of 60.48 gms. of 4,4'-diphenylether diisocyanate in 458 ml. of nitrobenzene and 67 ml. of toluene. To the solution was added 5.64 ml. of N-methylpyrrolidone saturated with sodium cyanide. A temperature rise was immediately noted and polymer began to precipitate from solution. To facilitate stirring the reaction slurry was diluted with an additional 50 ml. of toluene. After a total reaction time of twenty minutes the precipitated polymer characterized by the imino-1,3-imidazolidinedione ring was filtered. Half of the product was washed with methanol and collected on a filter; this is product A. The second half of the product was washed with toluene and collected on a filter; this is product B.

Product A was suspended in 77.6 wt. percent sulfuric acid for thirty minutes at room temperature. It was then collected on a filter, washed with water until the washes were neutral to pH paper. It was finally washed with methanol and acetone and dried. The dry product had an inherent viscosity of 1.74 and was characterized by the 1,3-imidazolidinetrione ring.

Product B was suspended in 70 wt. percent sulfuric acid at 100° C. for forty minutes to hydrolyze the imino groups. It was then collected on a filter, washed with water until the washes were neutral to pH paper, and finally washed with methanol and acetone. The dry product had an inherent viscosity of 0.89 and had an infrared spectrum identical to that of the product formed by the hydrolysis of product A (above).

EXAMPLE 2

A solution of 6 gms. (0.225 mole) of hydrogen cyanide in 144 ml. of nitrobenzene was mixed with a solution of 56.7 gm. (0.225 mole) of 4,4'-diphenylether diisocyanate in 483 ml. of nitrobenzene. To the mixture was added 2 ml. of N-methylpyrrolidone saturated with sodium cyanide. Eight minutes later the reaction mixture was too thick to stir and 18 ml. of water and 36 ml. of acetone were added and the polymerization reaction was stopped. A granular polymer (product A) was broken up in a Waring Blendor, washed with methanol and air dried. A portion of polymer A was suspended in 400 ml. of aqueous 70% nitric acid at room temperature for thirty minutes and stirred. The product was washed with water, methanol, and a 1:1 solution of methanol and acetone and then dried. The product B had an inherent viscosity of 1.7.

A second portion of polymer A was suspended in 50% sulfuric acid at room temperature for thirty minutes and then worked up similarly as above. The product C had an inherent viscosity of 2.22.

Both products B and C had identical infrared spectra and were characterized by the 1,3-imidazolidinetrione rings.

EXAMPLE 3

A solution of 11.5 gms. of hydrogen cyanide in 140 ml. of nitrobenzene was mixed with 106.5 gm. of diphenylmethane diisocyanate in 1262 ml. of nitrobenzene and 74 ml. of toluene. To the mixture was added 10 ml. of N-methylpyrrolidone saturated with sodium cyanide. In about two minutes a precipitate appeared. The precipitated polymer was filtered after a reaction time of about forty-five minutes. After washing the product (A) with methanol, about half of it was dissolved in 2000 ml. of N-methylpyrrolidone and hydrolyzed by the addition of 80 ml. of aqueous 37% hydrochloric acid. The hydrolyzed polymer was precipitated by the slow addition of water, filtered and washed with water until neutral. The product was then washed with methanol and dried. This is product B.

The second half of the precipitated polymer A obtained in the polymerization and characterized by the imino-1,3-imidazolidinedione ring was washed several more times with methanol and dried. It was then separated into two parts which were hydrolyzed by two different procedures.

(1) 2 gms. of the dried polymer were stirred in an aqueous solution of 37% hydrochloric acid for two hours at 60° C., filtered, washed with water until neutral, and then with methanol and dried. The hydrolyzed polymer (product C) was characterized by 1,3-imidazolidinetrione rings.

(2) The remaining portions of dried polymer A was dissolved in 750 ml. of dimethylformamide. A solution of 100 ml. of concentrated hydrochloric acid in about 900 ml. of dimethylformamide was prepared, and the liter of solution added to the dissolved polymer. A fine precipitate formed during the hydrolysis. Half the product solution was collected on a filter and washed with water until neutral to pH paper, then with methanol, and dried (product D).

The other half of the hydrolysis suspension was stirred while water was added to completely precipitate the polymer. The product was collected on a filter, washed as usual, and dried (product E). The dried products (B, C, D, E) were all completely hydrolyzed and were identical to each other. Molded products were made with no evidence of decomposition.

The foregoing Examples 1–3 illustrate the hydrolysis of a solid precursor polymer, which precipitates as a solid during the formation thereof, by suspension in an aqueous Brönsted acid or by redissolving it in a suitable solvent and adding acids to the solution. By either procedure, the hydrolysis was successful. Furthermore, the solid precursor polymer may be contacted with anhydrous hydrogen chloride to form the acid salt. Then the hydrolysis may be completed by contacting the polymer with water. The following examples illustrate hydrolysis procedures for precursor polymers that because of the choice in reaction solvent remain in solution during their formation.

EXAMPLE 4

A solution of 51 gms. hydrogen cyanide in 175 ml. N-methylpyrrolidone and a solution of 470 gms. 4,4'-diphenylmethane diisocyanate in 1000 ml. N-methylpyrrolidone were added simultaneously to 6000 ml. of N-methylpyrrolidone to which had been added 25 ml. of the same solvent saturated with sodium cyanide. The reaction temperature rose to 52° C. The addition required about ten minutes. Thirty minutes later 20 gms. of triethylamine was added. After stirring an additional thirty minutes, 200 ml. 37% hydrochloric acid was added slowly. The exothermic reaction was controlled with an ice bath so that the temperature never exceeded 35° C. during the addition. After stirring an additional thirty minutes, the reaction solution was poured into methanol to precipitate the polymer. The dry powder weighed 500 gms. and had an intrinsic viscosity of 1.46. The polymer melted at 293° C.

Clear tough films could be cast from solutions of the polymer in dimethylformamide.

The polymer was insoluble in toluene, chloroform, tetrahydrofuran, acetone, and propanol. However, it was soluble in dimethylformamide, N-methylpyrrolidone, dimethylsulfoxide, and hexamethylphosphoramide.

The infrared spectrum of the film showed the expected strong absorption band at 5.78μ.

EXAMPLE 5

A solution of 28 gms. of hydrogen cyanide in 168 gms. of N-methylpyrrolidone and 175 gms. of pure hexamethylene diisocyanate were added simultaneously to 500 ml. of N-methylpyrrolidone and 15 ml. of the same solvent saturated with sodium cyanide. The temperature rose to 87° C. After the reaction solution cooled to 30° C., 24 gms. of triethylamine was added, and the reaction solution was heated to 67° C. About an hour later the reaction solution had cooled to 45° C. and 100 ml. of 37% hydrochloric acid was added dropwise to it. The temperature never exceeded 53° C. during this hydrolysis.

The polymer was precipitated in water. The polymer had an inherent viscosity of 0.24 and melted at 55° C. The polymer may be characterized by the following structure:

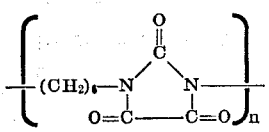

EXAMPLE 6

A solution of 65 gms. of hydrogen cyanide in 150 ml. of N-methylpyrrolidone and a solution of 606.9 gms. of 4,4'-diphenylether diisocyanate in 1000 ml. of N-methylpyrrolidone were added simultaneously to 3000 ml. of N-methylpyrrolidone to which had been added 25 ml. of the same solvent saturated with sodium cyanide. After the addition was complete, an additional 4500 ml. of solvent was added to the viscous reaction solution. Then 24 gms. of triethylamine were added to the reaction solution at 44° C. Then after two hours, 250 ml. of 37% hydrochloric acid was added while maintaining the temperature between 30° and 40° C. The product was precipitated in a 50% aqueous solution of methyl alcohol. The polymer weighed 670 gms. and had an intrinsic viscosity of 1.57. The polymer melted at 301° C. and may be characterized by the following structure:

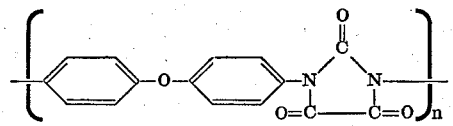

*Analysis.*—Calculated for (C$_{15}$H$_8$N$_2$O$_4$) (percent): C, 64.29; H, 2.87; N, 9.99. Found (percent): C, 64.16; H, 2.77; N, 9.92.

The polymer formed a clear tough film when cast from solution. At room temperature the film had a tensile strength of 15,000 p.s.i. and a Young's modulus of 380,000 p.s.i. The film showed outstanding stability as to oxidation and heat wherein after aging in a forced air oven at 250° C. for 500 hours, it retained its tensile strength of about 15,000 p.s.i. at room temperature. Furthermore, the film retained much of its tensile strength at elevated temperatures (7200 p.s.i. measured at 260° C.).

EXAMPLE 7

A solution of 48 gms. of hydrogen cyanide in 175 ml. of N-methylpyrrolidone and a solution of 446 gms. of 4,4'-diphenylether diisocyanate in 1000 ml. of N-methylpyrrolidone were added simultaneously to 3000 ml. of the solvent which contained 25 ml. of a solution of N-methylpyrrolidone saturated with sodium cyanide. Additional (2000 ml.) solvent had to be added to thin the viscous reaction solution. Then 18 gms. of triethylamine was added. After stirring two hours, 25 ml. of methanol was added to react with all unreacted isocyanate groups. Then 200 ml. of 37% hydrochloric acid was added slowly while controlling the temperature between 34° and 46° C. The polymer was precipitated in water to give 465 gms. of product which had an intrinsic viscosity of 0.92. The polymer melted at 301° C. and may be characterized by the structure similarly as Example 3.

*Analysis.*—Calculated for (C$_{15}$H$_8$N$_2$O$_4$)$_n$ (percent): C, 64.29; H, 2.88; N, 9.99. Found (percent): C, 64.50; H, 3.01; N, 9.89.

The polymer formed a tough film when cast from dimethylformamide solution.

While it may be preferred to form the precursor heterocyclic polymers which are hydrolyzed according to the present invention by the reaction of hydrogen cyanide with diisocyanates in the presence of an added cyanide ion, the precursor heterocyclic polymers which are hydrolyzed to the polymers of the present invention may be formed by other methods which are illustrated in the following examples.

EXAMPLE 8

To a cooled (6° C.) solution of 12 gms. (0.41 mole) of hydrogen cyanide in 300 gms. of dry dimethylformamide is added 69.2 gms. (0.4 mole) of toluene diisocyanate (80 percent of the 2,4-isomer and 20 percent of the 2,6-isomer). The temperature rose from 6° to 54° C. within seven minutes. The solution remained at 54° C. for three minutes and then was slowly cooled over a period of fifty minutes to 30° C. To a portion of the reaction solution diluted with 50 ml. of dimethylformamide was added 120 ml. of 37% hydrochloric acid with rapid stirring. Hydrolysis was an exothermic reaction, and a white polymeric material separated from the solution. The product was put in a Waring Blendor with ice and stirred, and the resulting solid product was washed with water until neutral to pH paper. The dry product weighed 36 gms. The infrared spectrum exhibited maxima at 2.80, 2.85, and 5.80 (broad) microns. X-ray analysis indicates that this product is amorphous.

It is significant to note that the dimethylformamide was not only a suitable solvent but also appeared to have sufficient catalytic activity with the aromatic diisocyanate to carry out the initial polymerization.

EXAMPLE 9

A solution of 5 gms. of hydrogen cyanide in 150 ml. of toluene is added to a solution of 50.4 gms. of hexamethylene diisocyanate in 150 ml. of toluene containing 3 ml. of dry pyridine at 7° C. No temperature rise is noted. The reaction solution is allowed to warm to room temperature under nitrogen and to remain there for sixty hours. At the end of this period an infrared spectrum of the reaction solution revealed that none of the characteristic absorption peaks for polymers having the imino imidazolidinedione ring was obtained. Thus, the weakly basic pyridine is ineffective in catalyzing the reactions to form polymer with hydrogen cyanide and an aliphatic diisocyanate at this temperature.

Then 1.5 gms. of triethylamine was added to the reaction solution and additional hydrogen cyanide generated from 0.3 mole of sodium cyanide was passed through the reaction solution. The temperature spontaneously rose to 48° C. and the solution became viscous. Then 50 ml. of methyl alcohol was added to the reaction solution to react with the isocyanate end groups to block their further reaction with the imino groups on the imidazolidine rings which would produce a cross-linked polymer. A cream-colored product weighing 16 gms. was obtained. The polymer was soluble in chloroform, tetrahydrofuran, formic acid, pyridine, dimethylformamide, and dimethylsulfoxide. The polymer had an inherent viscosity of 0.11.

A portion of the polymer formed is mixed with 100 ml. of concentrated hydrochloric acid to hydrolyze the imino group on the product. The reaction is extremely exothermic, producing a white product which was collected on a filter, resuspended in acetone diluted with petroleum ether, filtered, and dried. The product had an infrared absorption spectra maxima at 5.8μ (broad). The polymer was soluble in cold formic acid, dimethylformamide, hexamethylphosphoramide, and dimethylsulfoxide. The polymer was insoluble in cold and hot chloroform, acetone, methylethylketone, tetrahydrofuran, ethylacetate, and pyridine. The polymer had an inherent viscosity of 0.08.

EXAMPLE 10

A solution of 8.4 gms. (0.05 mole) of hexamethylene diisocyanate in 25 ml. of dry N-methylpyrrolidone is added dropwise to a solution of 11.1 gms. (0.05 mole) of hexamethylene dicyanoformamide and 1 ml. triethylamine in 25 ml. of dry N-methyl-pyrrolidone. The reaction is done in a dry flask in a nitrogen atmosphere. The temperature is controlled between 28° and 30° C. during the addition which requires one hour. The reaction solution is then warmed to 35° C. where it remains for three hours.

The reaction solution was diluted slowly with concentrated hydrochloric acid until a solid began to separate from solution. The reaction was exothermic. The solution was poured into ice and water to precipitate the hydrolyzed polymer which had the following repeating unit.

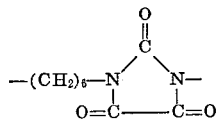

After two purifications by dissolution in dimethylformamide and precipitation in water, the colorless polymer had an inherent viscosity of 0.14. The polymer is soluble in acetone, tetrahydrofuran, pyridine, dimethylformamide, dimethylsulfoxide, and hexamethylphosphoramide. Thermogravimetric analysis showed it was stable up to about 380° C. in nitrogen.

The hydrolyzed polymer from Examples 9 and 10 may both be characterized by the same formula as shown in Example 10. If the chain length of the backbone of the precursor polymer produced by the reaction of the diisocyanate with hydrogen cyanide is the same as when produced by the reaction of the diisocyanate with its dicyanoformamide, identical polymers would be formed by the hydrolysis.

EXAMPLE 11

Three ml. of triethylamine are added to a solution of 15.2 gms. (0.05 mole) of diphenylmethane dicyanoformamide and 8.4 gms. (0.05 mole) of hexamethylene diisocyanate in 60 ml. dimethylformamide. The temperature rose from 27° to 56° C. within five minutes and thirty minutes after the addition of the catalyst solution it had cooled to 37° C. The reaction solution is then poured into toluene to precipitate the polymer. After washing with petroleum ether and drying, the polymer had an inherent viscosity of 0.18. The infrared spectrum had absorption maxima at 3.06, 4.41, 5.56, 5.75, and 5.98μ which are characteristic of the assigned structure. The polymer is characterized by having the following repeating unit:

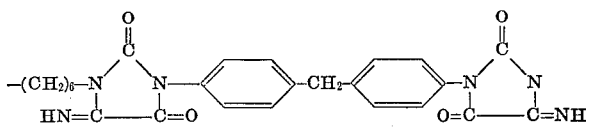

*Analysis.*—Calculated for polymer having repeating unit above $(C_{25}H_{24}N_6O_4)_n$ (percent): C, 63.55; H, 5.12; N, 17.78. Found (percent): C, 63.25; H, 5.27; N, 17.64.

To a solution of 4 gms. of the polymer in 40 ml. dimethylsulfoxide was slowly added 10 ml. of 37% hydrochloric acid. The product fell out of solution and slowly solidified and crumbled. After pouring the reaction mixture into ice water, it was filtered and washed with water until neutral to pH paper. After drying it weighed 3.5 gms. and had an inherent viscosity of 0.18.

EXAMPLE 12

A solution of 55 gms. (0.22 mole) of diphenylmethane diisocyanate in 125 ml. N-methylpyrrolidone was added to a solution of 44.4 gms. (0.20 mole) of hexamethylene dicyanoformamide and 2 ml. triethylamine in 150 ml. N-methylpyrrolidone in a dry nitrogen atmosphere. Addition required one hour and the temperature was controlled at 25°–30° C. by a water bath. After stirring four hours, a half of the reaction solution was poured into toluene to precipitate 47 gms. of polymer having an inherent viscosity of 0.70 in N-methylpyrrolidone (C, 0.3 gm./100 ml.) at 25° C. A film formed from the polymer had a tensile strength at break of 12,000 p.s.i. and a 1% secant modulus of 322,000 p.s.i.

Half of the solution of the polymer in N-methylpyrrolidone was diluted by the slow addition of 60 ml. of 37% concentrated hydrochloric acid. The product was poured into water to precipitate 46 gms. of hydrolyzed polymer. The polymer had an inherent viscosity of 0.51 in N-methylpyrrolidone (C, 0.5 gm./100 ml.) at 25° C. The hydrolyzed polymer was pressed into a clear film at 660° F. and 20 tons pressure. The polymer had a tensile strength at break of 13,000 p.s.i. and a 1% secant modulus of elasticity of 337,000 p.s.i. The clear film showed no weight loss in air or nitrogen at 350° C. by differential thermal analysis.

EXAMPLE 13

To a solution of 2.2 gms. (0.01 mole) of hexamethylene dicyanoformamide, 2.5 gms. (0.01 mole) of diphenylmethane diisocyanate in 20 ml. of dimethylsulfoxide was added 1 ml. of triethylamine. After two hours the solution was poured into water to precipitate a white colorless polymer. The polymer had an inherent viscosity of 0.17 in dimethylformamide (C, 0.5 gm./100 ml.) at 25° C. The molecular weight was found to be 1150 by vapor phase osmometry in dimethylformamide at 100° C. The nuclear magnetic resonance spectrum showed that only about half of the expected imino groups were present.

Therefore, about half of the imino groups were hydrolyzed during the precipitation in water. The polymer formed a clear flexible film at 400° F. and 10 tons pressure.

The following examples illustrate the formation of a number of different copolymers. The copolymers may contain two or more different organic moieties in various molar ratios. The organic moieties in the copolymer may range in concentration between 1 and 99 mole percent.

EXAMPLE 14

A solution of 64 gms. of hydrogen cyanide and 70 gms. of hexamethylene diisocyanate in 145 ml. N-methylpyrrolidone and a solution of 470 gms. of 4,4'-diphenylmethane diisocyanate in 1000 ml. N-methylpyrrolidone were added simultaneously to 4000 ml. of N-methylpyrrolidone to which had been added 25 ml. of the same solvent saturated with sodium cyanide. The temperature reached 53° C. during the addition which required eight minutes. During the next two hours the reaction solution slowly cooled to 38° C. Then 24 gms. of triethylamine was added. The temperature was increased to 58° C. where it remained for one hour. This additional heat was supplied to insure formation of the heterocyclic rings. It was then cooled to 32° C., and 240 ml. of 37% hydrochloric acid was added dropwise to hydrolyze the imino groups on the heterocyclic rings.

The product was precipitated in water. The off-white product weighed 590 gms. and had an intrinsic viscosity of 0.35. The polymer melted at 247° C. and is characterized by the following repeating units which are distributed in the polymer chain in the ratio indicated:

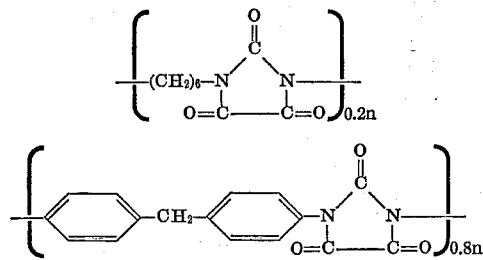

*Analysis.*—Calculated for $(C_9H_{12}N_2O_3)_{0.2}(C_{16}H_{10}N_2O_3)_{0.8}$ (percent): C, 66.96; H, 4.00; N, 10.71. Found (percent): C, 67.05; H, 4.07; N, 10.64.

EXAMPLE 15

A solution of 61.3 gms. of hydrogen cyanide in 160 ml. N-methylpyrrolidone and a solution of 454 gms. of 4,4'-diphenylmethane diisocyanate and 76.3 gms. of hexamethylene diisocyanate in 1000 ml. N-methylpyrrolidone were added simultaneously to 2000 ml. of N-methylpyrrolidone which contained 25 ml. of a saturated solution of the sodium cyanide in the solvent. After two hours 23 gms. of triethylamine was added and the solution stirred an additional two hours. Then 230 ml. of 37% hydrochloric acid was added dropwise at a temperature of 44–50° C. The product was precipitated in water. The white product weighed 576 gms. and had an intrinsic viscosity of 0.57. A higher molecular weight polymer was formed by this procedure in which the diisocyanates were premixed before reaction with hydrogen cyanide than in Example 6 wherein one of the diisocyanates was mixed with hydrogen cyanide. The polymer melted at 247° C. and may be characterized similarly as Example 14 except that the repeating units were distributed more randomly as indicated by differential scanning calorimetry measurements.

*Analysis.*—Calculated for $(C_9H_{12}N_2O_3)_{0.2}(C_{16}H_{10}N_1O_2)_{0.8}$ (percent): C, 66.96; H, 4.00; N, 10.71. Found (percent): C, 66.71; H, 3.82; N, 10.68.

EXAMPLE 16

A solution of 59 gms. hydrogen cyanide in 145 ml. N-methylpyrrolidone and a solution of 273 gms. of 4,4'-diphenylmethane diisocyanate and 275 gms. of 4,4'-diphenylethyl diisocyanate in 1000 ml. of N-methylpyrrolidone were added simultaneously to 4000 ml. N-methylpyrrolidone which contained 25 ml. of the same solvent saturated with sodium cyanide. After the additions were complete an additional 3500 ml. of solvent was added to dilute the viscous solution. Then 44 gms. of triethylamine was added, and an hour later 225 ml. of 37% hydrochloric acid was added dropwise to hydrolyze the polymer. The temperature was controlled between 30° and 43° C.

The product was precipitated in water. The dry white polymer weighed 590 gms. and had an intrinsic viscosity of 0.69. The random copolymer melted at 227° C.

A tough transparent film was cast from dimethylformamide solutions of the polymer.

EXAMPLE 17

A solution of 56 gms. of hydrogen cyanide in 158 ml. of N-methylpyrrolidone and a solution of 261 gms. of 4,4'-diphenylether diisocyanate and 174 gms. of hexamethylene diisocyanate in 900 ml. of N-methylpyrrolidone were added simultaneously to 4000 ml. of N-methylpyrrolidone which contained 25 ml. of a saturated solution of sodium cyanide in the same solvent. The temperature rose to 52° C. Then 21 gms. of triethylamine was added to the reaction solution. After two hours 200 ml. of 37% hydrochloric acid was added dropwise. The temperature was controlled at 43°–48° C. The random copolymer was precipitated in water. The dry product weighed 475 gms., had an intrinsic viscosity of 0.36, and melted at 178° C.

EXAMPLE 18

A solution of 58 gms. of hydrogen cyanide in 150 gms. of N-methylpyrrolidone and a solution of 271 gms. of diphenylether diisocyanate and 181 gms. of hexamethylene diisocyanate in 900 ml. N-methylpyrrolidone were added simultaneously to 500 ml. of N-methylpyrrolidone which contained 25 ml. of the solvent saturated with sodium cyanide. Then 22 gms. of triethylamine was added. It was heated and stirred at 65° C. for two hours. Then 200 ml. of 37% hydrochloric acid was added dropwise. The temperature during hydrolysis was controlled at 44°–55° C. Then 1000 ml. of solvent was added to thin the solution. The product was precipitated in water. The dry random copolymer weighed 486 gms., had an intrinsic viscosity of 0.57, and melted at 178° C.

EXAMPLE 19

A solution of 43 gms. of hydrogen cyanide in 147 ml. of N-methylpyrrolidone and a solution of 138 gms. of toluene diisocyanate and 199 gms. of diphenyl methane diisocyanate in 900 ml. N-methylpyrrolidone were added simultaneously to a solution of 1000 ml. of N-methylpyrrolidone and 25 ml. of a solution of the solvent saturated with sodium cyanide. Then 16 gms. of triethylamine was added. Later 10 ml. of methanol was added followed by 150 ml. of 37% hydrochloric acid. The temperature was 54°–60° C. The product was precipitated in water. It weighed 336 gms. and had an inherent viscosity of 0.23.

EXAMPLE 20

A solution of 72 gms. of hydrogen cyanide in 148 ml. N-methylpyrrolidone and a solution of 334 gms. of diphenylmethane diisocyanate and 225 gms. of hexamethylene diisocyanate in 900 ml. of N-methylpyrrolidone and 25 ml. of N-methylpyrrolidone saturated with sodium cyanide. The temperatures rose from 24° C. to 113° C. The very viscous reaction soltuion was diluted with 2200 ml. of N-methylpyrrolidone. Then 27 gms. of triethylamine was added. After the reaction cooled to 42° C., 270 ml. of 37% hydrochloric acid was added slowly while keeping the temperature at 42°–47° C.

The polymer was precipitated in water. After drying the polymer weighed 585 gms., had an inherent viscosity of 0.70, and melted at 180° C.

EXAMPLE 21

A solution of 66 gms. of hydrogen cyanide in 157 ml. of N-methylpyrrolidone and a solution of 307 gms. of hexamethylene diisocyanate and 152 gms. of diphenylmethane diisocyanate in 1000 ml. of N-methylpyrrolidone were added simultaneously to 500 ml. of N-methylpyrrolidone and 25 ml. of the same solvent saturated with sodium cyanide. The temperature rose to 85° C., and an additional 600 ml. of N-methylpyrrolidone was added to the very viscous solution. Later 48 gms. of triethylamine was added. Then 500 ml. of additional solvent was added to dilute the solution for hydrolysis. Then 250 ml. of 37% hydrochloric acid was added slowly to the reaction solution while keeping the temperature between 40°-45° C.

The copolymer was precipitated in water. The dry product had an intrinsic viscosity at 0.45 and melted at 111° C.

EXAMPLE 22

A solution of 58.8 gms. hydrogen cyanide in 158 ml. of N-methylpyrrolidone and a solution of 275 gms. of hexamethylene diisocyanate and 137 gms. of diphenylether diisocyanate in 1000 ml. of N-methylpyrrolidone were added to 1000 ml. of N-methylpyrrolidone and 25 ml. of the solvent saturated with sodium cyanide. The temperature rose to 86° C. After adding 44 gms. of triethylamine the reaction solution was diluted with 600 ml. of N-methylpyrrolidone. Then 230 ml. of 37% hydrochloric acid was slowly added at a temperature of 30-45° C.

The product was precipitated in water. The dry polymer had an inherent viscosity of 0.98 and melted at 118° C.

The following examples illustrates that an isolated precursor heterocyclic polymer characterized by the iminoimidazolidinedione rings may be redissolved and hydrolyzed to a polymer of the present invention.

EXAMPLE 23

One hundred (100) gms. of poly(hexamethylene-imino-1,3-imidazolidinedione-1,3-diyl) which was made by the reaction of hydrogen cyanide with hexamethylene diisocyanate in the presence of an added cyanide ion and had an intrinsic viscosity of 0.21 was redissolved in 1500 ml. N-methylpyrrolidone. Then 50 ml. of 37% hydrochloric acid was added dropwise. The reaction solution was then poured into water to precipitate poly(hexamethylene-1,3-imidazolidine-2,4,5-trione-1,3-diyl). It had an intrinsic viscosity of 0.19 and melted at 55° C. The hydrolysis reaction of the precursor polymer to form the hydrolyzed polymer of the present invention is characterized by the following:

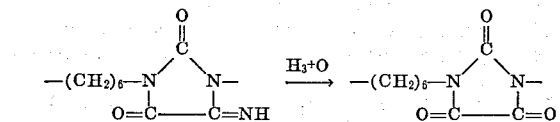

The polymer formed had the same structure as the polymer formed in Example 5.

In the foregoing examples, aqueous hydrochloric acid was used for the hydrolysis; however, the hydrolysis may be carried out by other procedures which are illustrated in the following examples.

EXAMPLE 24

A solution of 54.3 gms. of hydrogen cyanide in 175 ml. of N-methylpyrrolidone and a solution of 524 gms. of 4,4'-methylenebis(cyclohexyl isocyanate) in 800 ml. of N-methylpyrrolidone were added to 1000 ml. of N-methylpyrrolidone and 25 ml. of the solvent saturated with sodium cyanide. The temperature increased to 70° C. Later 20 gms. of triethylamine were added. After stirring ninety minutes the viscous solution was diluted with 2000 ml. of solvent. Then 200 ml. of 30% sulfuric acid was added slowly to the reaction solution.

The polymer was precipitated in water. After drying it melted at 228° C.

This example illustrates that acids other than hydrochloric acid may be used for the hydrolysis.

EXAMPLE 25

A polymer was prepared by the reaction of 36.6 gms. of hydrogen cyanide with a mixture of 182 gms. of hexamethylene diisocyanate and 68 gms. of 4,4'-diphenylether diisocyanate in 2200 ml. of N-methylpyrrolidone using the procedure described in Example 22. The polymer was hydrolyzed by adding a solution of 150 ml. of 37% hydrochloric acid in 300 ml. of N-methylpyrrolidone. The addition required only fifteen minutes and the temperature of the reaction solution rose from 45° to 50° C.

The product was precipitated in water to give a colorless polymer which melted at the same temperature (118° C.) as the polymer made in Example 22. It had an inherent viscosity of 0.28.

This example demonstrates that the aqueous solution of 37% hydrochloric acid may be diluted in N-methylpyrrolidone before addition to the polymer solution.

EXAMPLE 26

A polymer was prepared by adding 53 gms. of hydrogen cyanide in 180 ml. of N-methylpyrrolidone to a solution of 490 gms. of 4,4'-diphenylmethane diisocyanate in 6000 ml. of N-methylpyrrolidone to which had been added 25 ml. of the same solvent saturated with sodium cyanide. The temperature rose to 45° C. After it had cooled to 29° C., 20 gms. of triethylamine was added. After stirring for thirty minutes, 30 ml. of methanol was added and the product was then precipitated in toluene. The dry polymer had an intrinsic viscosity of 0.73. Portions of this polymer were hydrolyzed by the procedures described in Examples 27, 28, 29 and 30 which follow.

EXAMPLE 27

Hydrogen chloride was bubbled through a solution of 5 gms. of the polymer of Example 26 in 65 ml. of N-methylpyrrolidone. The temperature increased from 23° to 92° C. within five minutes. The flow of hydrogen chloride was stopped, and the solution was stirred an additional five minutes. The solution was poured into water to precipitate 4.4 gms. of polymer having an inherent viscosity of 0.63. The infrared spectrum of a thin film of the polymer was identical to that of the polymer made in Example 3.

EXAMPLE 28

Five (5) ml. of 37% hydrochloric acid was added dropwise to a solution of 5 gms. of the polymer of Example 26 in 65 ml. of N-methylpyrrolidone. The temperature never exceeded 45° C. because the aqueous acid had to be added very slowly to prevent precipitation of the polymer (unlike the use of gaseous HCl where no precipitation occurred during its rapid addition). The solution was stirred for five minutes after completion of the addition, and the polymer was precipitated in water. The dry polymer had an inherent viscosity of 0.63 and an infrared spectrum identical to that in Example 27; however, the polymer of Example 27 had a more uniform particle size and greater bulk density than the polymer of Example 28.

EXAMPLE 29

A solution of 1.5 gms. of anhydrous hydrogen chloride in 16 ml. of N-methylpyrrolidone was added to 5 gms. of the polymer of Example 26 in 65 ml. of N-methylpyrrolidone. The addition required only a few seconds and the reaction temperature increased to only 31° C. It was stirred ten minutes and then poured into water to precipitate the polymer which had an inherent viscosity of 0.63. The infrared spectrum was identical to that of the polymer made in Example 27.

EXAMPLE 30

The experimental procedure was identical to that of Example 29, except the reaction solution was stirred three hours instead of only ten minutes before precipitating the polymer. The product had an inherent viscosity of 0.63 and was identical to the polymer formed in Example 29. This illustrates that extended exposure to anhydrous hydrogen chloride did not alter the structure nor the inherent viscosity of the product.

It is evident from the foregoing that this invention provides wholly new heterocyclic polymers which have, depending on their exact composition and molecular weights widely varying properties which adapt them to a variety of uses. The polymers of the present invention are useful for making films, fibers, foams, molded objects and the like. Films from the polymers of the present invention may be made by casting from solution or by forming under heat and pressure. The polymers are also useful in laminates and for making electrical insulators. The high temperature thermal stability of the polymers of the present invention allow them to be used in applications at elevated temperatures.

The polymers possess adhesive properties towards glass and metals, generally, and demonstrate high tenacity and bond strength when used as adhesives in the production of laminates.

The polymers may also be cast into films from solutions thereof, or fibers may be prepared therefrom by extruding the polymer into a precipitating bath. Coatings and fibers may also be obtained from the polymers by hotmelt techniques.

Some of the polymers are readily compression molded with heating to give well-dimensioned, smooth, shaped objects of high thermal stability and good mechanical strength.

The heat resistant polymers may be used as circuit breaker components, wire and cable insulation, bushings, structural electrical laminates, TV components, circuit boards, instrument housings, movie projector components, housings for power tools motor housings, fuel tanks and fuel tank liners, high temperature laminates, and other high temperature bonding applications. In addition, the polymers may be used in insulation varnish for wire enamel, motors, electrical equipment, and transformers. The polymers may also be used as capacitors for high frequency applications, in condensers, and interlayer insulation for transformer coils.

The polymers of the present invention are solids at room temperture. The melting points of the polymers range from 55° C. to above 300° C. Copolymers of the present invention may be produced which have a melting point within a chosen range. The desired melting point may be chosen within the broad range of 55° to above 300° C. and is obtained by varying the molar ratios of the monomers which are used to produce the copolymer. The melting point of a copolymer will vary almost linearly between the melting points of the homopolymers of the individual monomers.

The nature and objects of the present invention having been completely described and illustrated, what I wish to claim as new and useful and secure by Letters Patent is:

1. A polymer which is solid at room temperature and which, in each repeating unit, contains the 1,3-imidazolidine-2,4,5-trione-1,3-diyl ring of the following structure:

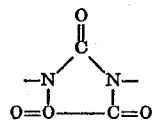

2. A polymer according to claim 1 characterized by the following structure:

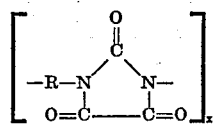

where:
R is an organic moiety selected from the group of aliphatic, alicyclic aromatic, mixtures thereof and functionally substituted derivatives thereof; and
$x$ is sufficiently large to produce a solid product.

3. A polymer according to claim 2 wherein R is an aliphatic moiety.

4. A polymer according to claim 3 wherein R is hexamethylene.

5. A polymer according to claim 2 wherein R is an aromatic moiety.

6. A polymer according to claim 2 wherein R is a mixed organic moiety.

7. A polymer according to claim 6 wherein R is diphenylmethane.

8. A polymer according to claim 6 wherein R is 2-methyl-1,5-phenylene.

9. A polymer according to claim 6 wherein R is bicyclohexylmethane.

10. A polymer according to claim 2 wherein R is an alicyclic organic moiety.

11. A polymer according to claim 2 wherein R is a functionally substituted organic moiety.

12. A polymer according to claim 11 wherein R is a diphenyl ether.

13. A polymer according to claim 2 characterized by having a mixture of the following structures:

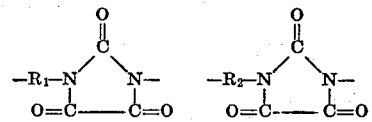

where:
$R_1$ and $R_2$ are different organic moieties selected from the group of aliphatic, alicyclic, aromatic, mixtures thereof and functionally substituted derivatives thereof, and the concentration of $R_1$ ranges from 1 to 99 mole percent and $R_2$ ranges from 99 to 1 mole percent.

14. A polymer according to claim 13 wherein $R_1$ is an aliphatic moiety and $R_2$ is a mixed organic moiety.

15. A polymer according to claim 14 wherein $R_1$ is hexamethylene and $R_2$ is diphenylmethane.

16. A polymer according to claim 13 wherein $R_1$ is an aliphatic moiety and $R_2$ is a functionally substituted organic moiety.

17. A polymer according to claim 16 wherein $R_1$ is hexamethylene and $R_2$ is diphenyl ether.

18. A polymer according to claim 13 wherein $R_1$ is a mixed organic moiety and $R_2$ is a functionally substituted organic moiety.

19. A polymer according to claim 18 wherein $R_1$ is diphenylmethane and $R_2$ is diphenyl ether.

20. A polymer according to claim 13 wherein $R_1$ and $R_2$ are both mixed organic moieties.

21. A polymer according to claim 20 wherein $R_1$ is 2-methyl-1,5-phenylene and $R_2$ is diphenylmethane.

22. A polymer according to claim 2 characterized by having the following structure:

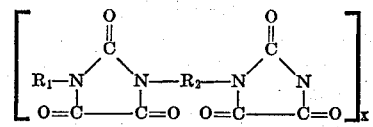

where:
$R_1$ and $R_2$ are organic moieties selected from the group of aliphatic, alicyclic, aromatic, mixtures thereof and functionally substituted derivatives thereof, and $R_1$ and $R_2$ are present in a 1:1 ratio; and $x$ is sufficiently large to produce a solid product.

23. A polymer according to claim 22 wherein $R_1$ is hexamethylene and $R_2$ is diphenylmethane.

24. A process which comprises: contacting a solution of a solid polymer chracterized by the presence in each repeating unit of a 1,3-imidazolidine-1,3-diyl ring of the following structure:

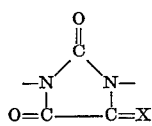

where:

X is selected from the group NH and N— and is in the 4 or 5 position with an aqueous Brönsted acid to hydrolyze the imino or carbamoyl group on said rings.

25. A process according to claim 24 wherein said acid is hydrochloric.

26. A process according to claim 24 wherein said acid is hydrobromic.

27. A process according to claim 24 wherein said acid is sulfuric.

28. A process according to claim 24 wherein said acid is nitric.

29. A process according to claim 24 wherein said polymer is suspended in an aqueous solution of an acid selected from the group consisting of hydrochloric, hydrobromic, sulfuric and nitric.

30. A process according to claim 24 wherein said acid is first mixed with the same solvent in which the polymer is dissolved and then contacting said polymer with the acid-solvent mixture.

31. A process according to claim 24 wherein X is NH and randomly distributed in the 4 and 5 position of the 1,3-imidazolidine-1,3-diyl rings in said polymer.

32. A process according to claim 24 wherein X is NH and alternating in the 4 and 5 position in adjacent 1,3-imidazolidine-1,3-diyl rings in said polymer.

33. A process according to claim 24 wherein X is NH and in the 4 position of the 1,3-imidazolidine-1,3-diyl rings in said polymer.

34. A process which comprises: contacting a solution of a solid polymer characterized by the presence of a mixture of imino-1,3-imidazolidine-1,3-diyl rings of the following structures:

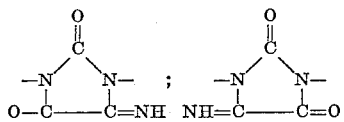

wherein each repeating unit contains one of said rings, with an anhydrous acid and then contacting the polymer with water to hydrolyze the imino groups on said rings.

35. A process according to claim 34 wherein said acid is hydrogen chloride.

36. A process according to claim 34 wherein said acid is hydrogen bromide.

37. A process according to claim 34 wherein said anhydrous acid is first mixed with the same solvent in which the polymer is dissolved and then contacting said polymer with the acid-solvent mixture.

38. A process according to claim 34 wherein said polymer is suspended and said anhydrous acid is admixed therewith.

39. A process according to claim 24 wherein said acid is formic.

References Cited

Oku et al.: Die Makromolecular Chemie, 78, pp. 186–193, 1964.

DONALD E. CZAJA, Primary Examiner

M. J. WELSH, Assistant Examiner

U.S. Cl. X.R.

117—124 D, 127, 128.4; 156—331; 161—190, 227; 260—47 CB, 2.5 R, 77.5 R